United States Patent [19]

Robbins

[11] 4,293,380

[45] Oct. 6, 1981

[54] REACTOR AND FUEL ASSEMBLY DESIGN FOR IMPROVED FUEL UTILIZATION IN LIQUID MODERATED THERMAL REACTORS

[76] Inventor: Thomas R. Robbins, 1528 Crofton Pkwy., Crofton, Md. 21144

[21] Appl. No.: 854,970

[22] Filed: Nov. 25, 1977

[51] Int. Cl.³ .............................................. G21C 7/00
[52] U.S. Cl. .................................. 376/209; 376/212; 376/329
[58] Field of Search ................... 176/20 R, 20 SS, 21, 176/30, 31, 42, 65, 86 L, 86 R, 92 R, 94

[56] References Cited

U.S. PATENT DOCUMENTS

| | | | |
|---|---|---|---|
| 3,070,531 | 12/1962 | Huet | 176/21 |
| 3,081,246 | 3/1963 | Edlund | 176/20 SS |
| 3,105,036 | 9/1963 | Puechl | 176/20 SS |
| 3,142,624 | 7/1964 | Edlund | 176/20 SS |
| 3,180,799 | 4/1965 | Blake | 176/21 |
| 3,801,443 | 4/1974 | Yasukawa | 176/30 |
| 3,928,128 | 12/1975 | Kollmar | 176/30 |

*Primary Examiner*—Donald P. Walsh
*Attorney, Agent, or Firm*—Sughrue, Mion, Zinn, Macpeak and Seas

[57] ABSTRACT

An improved reactor and fuel assembly design is disclosed wherein a liquid moderated thermal reactor is initially run with all or a portion of its fuel assemblies in an undermoderated boiling water mode to take advantage of increased conversion ratio at lower H/fuel ratios, and after a suitable period of operation, the neutron spectrum for all or a portion of the undermoderated boiling assemblies is shifted to lower energies to increase reactivity by converting a number of fuel assemblies to a nearer optimum moderated pressurized or non-boiling mode. The increased reactivity allows for continued operation of the modified assembly. The improved reactor and fuel assembly design results in improved fuel utilization and neutron economy and reduced control requirements for the reactor. The design may be augmented by reducing the number of fuel rods comprising the assembly after a suitable period of operation, as disclosed in the applicants copending application filed Nov. 1, 1977, Ser. No. 847,524.

15 Claims, 11 Drawing Figures

REACTOR AND FUEL ASSEMBLY DESIGN FOR IMPROVED FUEL UTILIZATION IN LIQUID MODERATED THERMAL REACTORS

CROSS REFERENCE TO INVENTION DISCLOSURE

The invention disclosed in this application was also disclosed in Document Disclosure 064266 filed in the U.S. Patent and Trademark Office on Sept. 16, 1977.

BACKGROUND OF THE INVENTION

1. Field of the Invention

The present invention relates to liquid moderated thermal reactors and, more particularly, to a method for operating a light water nuclear reactor resulting in improved fuel utilization and neutron economy and reduced control requirements.

2. The Prior Art

General methods of improving fuel utilization in nuclear reactors have been suggested and evaluated but are not immediately applicable to light water reactors of current design, or are impractical from a technological or economic viewpoint. One of the more promising reactor concepts is the spectral shift controlled reactor (SSCR), described in U.S. Pat. No. 3,081,246, which issued Mar. 12, 1963, to M. C. Edlund. This reactor operates with a mixture of heavy and light water as both coolant and moderator. Improved fuel utilization and a portion of the reactor control requirement are achieved by controlling the relative concentrations of light and heavy water in the coolant, and thereby changing the neutron slowing down power or moderation to change the average neutron energy in the reactor, and when fertile material is present to increase the productive resonance capture of neutrons by the fertile material. At the start of a fuel cycle, there is a high concentration of $D_2O$ in the core and the neutron spectrum is shifted toward higher energies, which reduces reactor excess reactivity and increases the reactor conversion ratio. As operation proceeds, $H_2O$ is added and the spectrum is shifted to lower energies, which increases reactivity and tends to reduce the conversion ratio. Unlike the present invention, the SSCR is based on continuous shifts in the neutron spectrum (characterized by the H/fuel ratio) throughout the lifetime of the fuel in the reactor. The present invention does not rely upon $D_2O$ to shift the neutron spectrum and does not require large changes in H/fuel ratio during each cycle of operation. As will be discussed in detail below, the neutron spectrum is shifted from an exceptionally low value used for initial operation to an exceptionally high value by changing the fuel assembly from a boiling to a non-boiling mode and optionally by withdrawing fuel rods from the reactor core and thereby reducing the relative amount of fuel in the core.

There are a number of disadvantages associated with the SCCR, most of which derive from the use of $D_2O$, which are avoided in the present invention. The $D_2O$ and the equipment required to handle it are expensive and a new supply of $D_2O$ is needed for each fuel cycle. The use of $D_2O$ results in the production of large quantities of tritium which are difficult to control and represent a potential radiological hazard. Since the coolant is changed from high concentration $D_2O$ to $H_2O$ each fuel cycle, the higher conversion ratio characteristic of large $D_2O$ concentrations is only achieved during a portion of the fuel cycle (i.e., the average coolant $D_2O$ concentration during the cycle is about one-half the initial and final values). At the start of operation of each cycle when the coolant is high concentration $D_2O$, the neutron leakage is larger than in a 100% water moderated reactor due to the smaller slowing down power of $D_2O$ as compared to $H_2O$. Neutron leakage from the core is reflected as a direct loss in conversion ratio, thus reducing the improvement in conversion ratio which could otherwise have been obtained by a shift in neutron energy spectrum.

U.S. Pat. No. 3,247,072 to M. C. Edlund discloses a method of operating a nuclear reactor wherein a hydrogen-bearing vapor is used to variably moderate and control the chain reaction. Variable control of the control rods in a conventional reactor is replaced by variation in the density of the steam within the reactor moderating loop and operating the steam at various combinations of pressures and temperatures. In contrast to the present invention, Edlund does not contemplate assembly operation in a non-boiling mode and teaches introducing a non-moderating gas, such as helium, nitrogen or, preferably, $D_2O$, when the pressure necessary in the coolant space is higher than the pressure necessary to obtain the desired moderation. In accordance with this practice, initially all or a portion of the assemblies are moderated by a two-phase mixture, and after a suitable period of operation, they are converted to subcooled pressurized water moderated assemblies. This stepwise conversion from steam to pressurized water moderator is not contemplated by Edlund.

Another patent to Edlund in this area is U.S. Pat. No. 3,142,624, which relates to a spectral shift controlled seed-blanket reactor.

Outside of shifting the neutron spectrum, the art takes various approaches to improving fuel utilization. Many of these approaches involve designing the reactor core with different spatial regions of different reactive systems. In U.S. Pat. No. 3,884,886 to Crowther, for example, plutonium fuel is placed in fuel assemblies at the periphery of the core where there is a low energy neutron spectrum, and enriched fuel assemblies are placed at the center portions of the core where there is a higher energy neutron spectrum. U.S. Pat. No. 3,141,827 to Ishenderian discloses a breeder reactor core with a central core of enriched fuel with alternate zones of depleted and enriched fuel. This arrangement causes a peak thermal flux to occur in the depleted elements which results in increased conversion of U-238 to PU-239. U.S. Pat. No. 3,093,563 to Menke teaches a reactor core constructed with an inner active core in the fast neutron range and an outer active core in the slow range. U.S. Pat. No. 3,351,532 to Raab, Jr., et al. teaches a seed-blanket reactor wherein the H/fuel ratio in the seed is set so the number of fissions in the seed is a maximum and the H/fuel ratio in the blanket is set so the number of conversions in the blanket is maximized. Unlike any of the latter group of reactors, the present invention does not rely upon a reactor core which is constructed with different spatial regions of different reactivity. Again, none of these inventions teaches the art of setting the H/fuel ratio at a low value for an initial period of operation by operating fuel assemblies in a boiling mode and later increasing the H/fuel ratio by converting the boiling assemblies to non-boiling operation.

SUMMARY OF THE INVENTION

In accordance with the invention, an improved reactor and fuel assembly design is provided for utilization in liquid moderated thermal reactors (e.g., both pressurized water reactors and boiling water reactors). The new reactor and fuel assembly design results in improved utilization of natural resources by increasing the energy production obtainable from a given quantity of nuclear fuel and by reducing parasitic absorption of neutrons in non-fertile materials, which would otherwise be required to achieve the increased energy production in the current conventional assembly designs for liquid moderated thermal nuclear reactors. Among the important unique features of the invention are that the improved fuel utilization and neutron economy are achieved through the embodiment of existing and proven technology. The invention may be utilized in existing nuclear reactors and those under construction with little, if any, modifications of the reactor internals or control systems. The new reactor and fuel assembly design may be readily incorporated within the physical envelope of any of the many existing and planned reactor designs of the several manufacturers of light water reactors.

The present invention is based on the well-known principal for thermal reactors that the slower the neutron (i.e., the greater the H/fuel ratio), the greater the probability there is to produce a fission, and the knowledge that fertile materials such as U-238 and thorium have significant resonance capture cross-sections at slightly higher neutron energies (i.e., lower H/fuel ratios). In conventional light water reactor operation, the reactor is run with a fixed lattice spacing of fuel rods in either a boiling or non-boiling mode from the commencement of operation until the fuel rods are discharged from the reactor. The H/fuel ratio is set so that the maximum controllable reactivity for the fresh fuel is obtained. At this H/fuel ratio, advantage is not taken of the significant resonance capture cross-sections of the fertile materials at the slightly higher neutron energies. Furthermore, in every nuclear reactor there must be arranged a quantity of fissionable material as a fuel and other materials such that there is a sufficient mass to produce a chain reaction. The mass of fissionable material is termed "a critical mass." In order to operate a reactor for an appreciable period of time, there must be included in the reactor an excess of fuel above the critical mass which represents the fuel which may be consumed during operation of the reactor. Consequently, by setting the H/fuel ratio to maximize the reactivity for the fresh fuel in accordance with the conventional approach, far more neutrons than necessary to sustain the chain reaction are produced, and these neutrons (excess reactivity) must be controlled. Neutron control systems either vary the number of neutrons which escape from the periphery of the reactor or non-productively absorb neutrons within the reactor or vary the amount of fuel in use. Consequently, conventional operation is neither fuel efficient nor neutron economic.

The present invention provides for operating the reactor with a large fraction of undermoderated assemblies (e.g., typically 50% of the core, but fractions up to 100% of the core can be practical), which reduces the inherent excess reactivity, thereby minimizing the excess neutrons which must be parasitically absorbed and taking advantage of the higher resonance capture cross-sections of the fertile materials in the higher neutron energy spectrum; and after a suitable period of operation, shifting the neutron energy spectrum to lower levels which raises the reactivity to a level higher in comparison to the reactivity level in conventional operation after a similar irradiation.

It is the primary object of the present invention to improve fuel utilization in a light water nuclear reactor by increasing the energy production obtainable from a given quantity of nuclear fuel and by reducing parasitic absorption of neutrons in non-fertile materials.

An important object of the present invention is to improve fuel utilization and neutron economy by a technique which can be utilized in existing nuclear reactors and those under construction using well-established light water reactor technology.

A further object of the present invention is to improve fuel utilization and neutron economy by shifting the neutron spectrum one or more times part way through the operation of the reactor without the disadvantages associated with the use of deutrium in the SCCR.

A related object of the present invention is to shift the neutron spectrum without relying upon $D_2O$.

A further object of the present invention is to improve fuel utilization by a reduction in the initial reactor and fuel assembly excess reactivity which must be controlled in order to achieve economical fuel exposures. A reduction in control requirements not only reduces the number of neutrons which are wasted by parasitic absorptions in non-fertile materials but also allows more economic fuel cycles which, for example, might be achieved by increasing the operating times between refuelings and/or increasing the discharge exposure of the fuel.

These and other objects of the present invention are attained by a new reactor concept in which improved fuel utilization is obtained by a large variation in the $H/U+Pu$ ratio (i.e., the H/fuel atomic ratio) of the fuel assemblies part way through their complete irradiation in the same reactor core. This change is accomplished by a step change in the average water density in the fuel assembly, which also may be augmented by a step change in the number of fuel rods comprising the fuel assembly, at some optimum point part way through the entire irradiation cycles of the fuel assembly. That is, the fuel assembly operates at a reduced moderator density, and optionally at an increased fuel loading density, for one or more fuel cycles, and then operates at increased moderator density, and optionally at a reduced fuel loading density, for the remaining one or more fuel cycles until the fuel assembly is unsuitable for additional operation and is discharged from the reactor. In this manner, the invention realizes the advantages associated with the SSCR concept but eliminates the disadvantages associated with the use of $D_2O$ in a light water reactor. In addition, the invention provides the flexibility to realize better fuel utilization than the SSCR concept by reducing neutron leakage from the core and allowing for the maintenance of a high conversion ratio continuously throughout one or more fuel cycles of operation. For a better understanding of the invention, its operating advantages and specific objects attained by its use, reference should be made to the accompanying drawings and descriptive matter in which there is illustrated and described a preferred embodiment of the invention.

DESCRIPTION OF THE INVENTION

Figure 1:
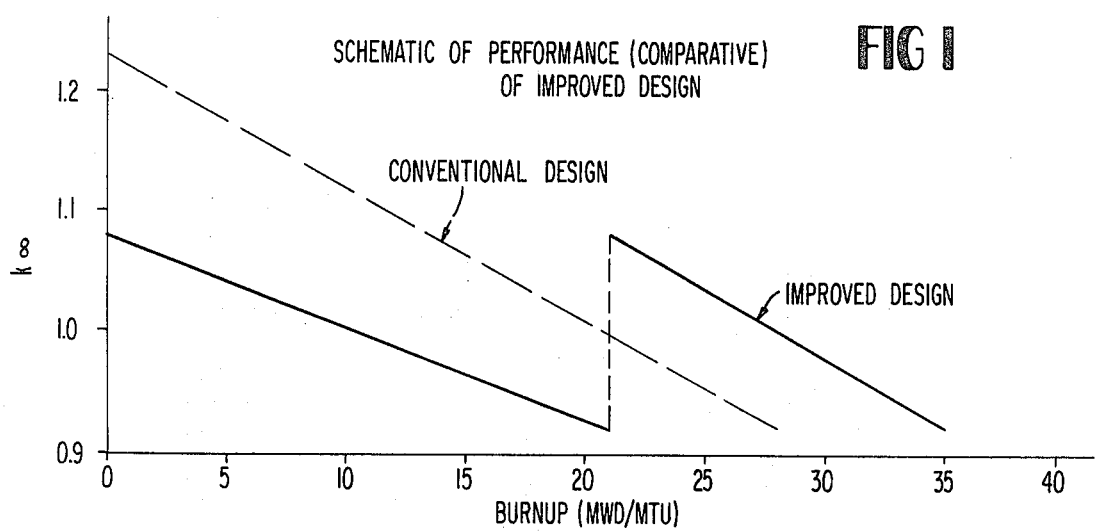
FIG. 1 is a plot of reactivity versus burn-up for a conventional operation and the present invention.

While the discussion which follows makes specific reference to light water reactors, it will be apparent to the skilled artisan that the principals involved are applicable to liquid moderated thermal nuclear reactors in general.

Throughout the specification and claims which make up this application, the terms "optimum moderated condition" and the like refer to moderating or slowing down the neutrons in the fuel assembly such that the probability of the neutrons producing a fission and more neutrons is maximized—i.e., the H/fuel atomic ratio is such that the lattice neutron multiplication factor is maximized. Likewise, an "undermoderated condition" is a condition in the fuel assembly where the neutrons are now slowed to the point at which fission is maximized—i.e., the H/fuel atomic ratio is less than that which maximizes the lattice neutron multiplication factor.

In accordance with the invention, initially all or a portion of the fuel assemblies comprising a reactor core operate as undermoderated boiling fuel assemblies. Where only a portion of fuel assemblies are boiling, the remainder of the fuel assemblies are non-boiling. The terms "boiling" and "non-boiling" as they are used throughout this specification refer to the state of the moderator within the assembly. Where the assembly is a "boiling" assembly, the moderator is in a two-phase state, such as is present in the fuel bundles of a boiling water reactor. Where the assembly is "non-boiling," the moderator is in the liquid state, like pressurized water is present in the fuel assemblies making up a pressurized water reactor. In accordance with the present invention, the boiling fuel assemblies are initially operated in an undermoderated condition. This condition is produced by initially operating the boiling fuel assemblies with a H/fuel ratio which is low in comparison to that which maximizes the lattice neutron multiplication factor. This means that the fuel loading density must be such that for the density of the moderator in the boiling fuel assembly the H/fuel ratio is low in comparison to that which maximizes the neutron multiplication factor. Accordingly, if the boiling fuel assembly operates at about the same moderator density achieved in a conventional boiling water reactor (BWR), the fuel loading density of the bundle making up the boiling assembly in the present invention will be increased with respect to that in a conventional BWR. On the other hand, if the moderator density is lower than that achieved in a conventional BWR, the fuel loading density in the bundles could be about the same as or lower than that in the typical BWR bundles.

The undermoderated condition in the boiling assemblies achieves a high conversion ratio and reduces the control requirements for the reactor. As a result of the lower H/fuel ratio in the boiling assemblies, the inherent excess reactivity of the lattice is reduced, thereby minimizing the number of excess neutrons which must be parasitically absorbed by any of the moveable control elements (e.g., control rods), fixed control elements (e.g., burnable poisons) and variable control systems (e.g., boric acid dissolved in the moderator). Instead, the excess neutrons are absorbed in the fertile fuel material (e.g., U-238 or Th-232), which results in the production of additional fissile materials during irradiation. The undermoderated boiling assemblies thereby achieve a larger conversion ratio (i.e., the ratio of captures in fertile materials to absorptions in fissile materials) during the first period of operation in the reactor compared to that of a current conventional BWR fuel assembly.

After a suitable period of operation, for instance, after the fuel assembly has been burned in the reactor for one or more fuel cycles so that the concentration of bred fissile materials (i.e., Pu-239, Pu-241 and/or U-233) approaches equilibrium concentration or, for instance, the excess reactivity of the fuel assembly becomes too small to support additional reactor operation; all or a number of the boiling assemblies are converted to non-boiling assemblies. When the fuel assemblies are changed to operation in the non-boiling mode, a large increase in the fuel assembly reactivity is obtained as a result of the large increase in H/fuel ratio. This change is due to the increase in moderator density within the fuel assembly. In the non-boiling mode, the assemblies are nearer the optimum moderated condition (i.e., the H/U+Pu ratio) for the concentrations of fissile and fertile fuel materials which exist in the fuel rods at the time of conversion. At the time of conversion, the original lattice is even more undermoderated than before irradiation began because the bred fissile materials (i.e., Pu-239, Pu-241 or U-233) have larger absorption probabilities than the materials which existed in the fuel rods before irradiation. Consequently, the optimum H/fuel ratio will be larger than that which would have been applicable to the initial fuel rods had they been originally irradiated at an optimum moderated condition, and a large increase in the assembly excess reactivity is obtained. This large increase in fuel assembly reactivity makes a positive contribution to the entire core excess reactivity.

The present design may be augmented by a change in the fuel loading density. By withdrawing a number of fuel rods from the fuel assembly after a suitable period of operation, the H/fuel ratio can be raised to a level higher than could be achieved by the conversion of boiling to non-boiling assemblies alone. The manner in which this fuel rod removal may be accomplished and an explanation of the effect which the fuel rod removal will have on fuel efficiency, neutron economy and the H/fuel ratio are set forth in detail in copending application Ser. No. 847,524, filed Nov. 1, 1977, which is herein incorporated in its entirety by reference. It will be apparent to the skilled artisan from the combined disclosures of this application and the copending application that fuel rod removal may take place at the same time as boiling to non-boiling conversion, in which case the result is a larger step increase in reactivity. On the other hand, the reactor design and power output may warrant fuel rod removal after a different period of operation, in which case an additional stepwise increase in reactivity is built into the process. In either case, it is clearly apparent to the skilled artisan that the instant design and that of the copending application compliment one another and the two may be combined in various manners depending on the reactor design and the amount of moderation required to increase fuel efficiency and neutron economy. The overall operation in two distinct neutron energy spectra results in improved fuel utilization compared to that which could be achieved by operating a conventional fuel assembly in a conventional boiling or non-boiling light water reactor throughout its entire irradiation time in the reactor.

The present invention will become even more clear by understanding the accompanying drawings. FIG. 1 is a comparison of fuel assembly performance in accordance with the present invention with conventional operation. FIG. 1 plots excess reactivity versus burn-up. The curve for the conventional reactor is characterized by high initial excess reactivity. The H/fuel ratio and neutron energy spectrum for the fuel assembly are fixed at the start of irradiation by the number and design of the fuel rods and the amount of coolant or moderator; consequently, the fuel assembly reactivity (or neutron multiplication factor) is constantly on the decline. The fuel assembly runs until its rate of neutron production is too low to support additional reactor operation. The present invention, however, is characterized by a much lower initial reactivity consistent with a reactor operating in an undermoderated condition with boiling, or boiling and non-boiling, fuel assemblies at a relatively lower H/fuel ratio. In accordance with the present invention, the assembly operates for an optimum period of time in this undermoderated condition during which time reactivity is on the decline, but at a slower rate of decline than the conventional operation. This is shown by the smaller slope of the first portion of the curve for the improved design. During this period of operation, the conversion ratio is higher than for the conventional design. Larger amounts of fertile materials are being converted to fissile materials in the assembly because the H/fuel ratio favors the resonance capture of neutrons by the fertile materials. During this period of operation, neutrons are being economically absorbed in the fertile material rather than parasitically absorbed by the neutron control system as they would be during the analogous period of operation in the conventional design.

Figure 7:
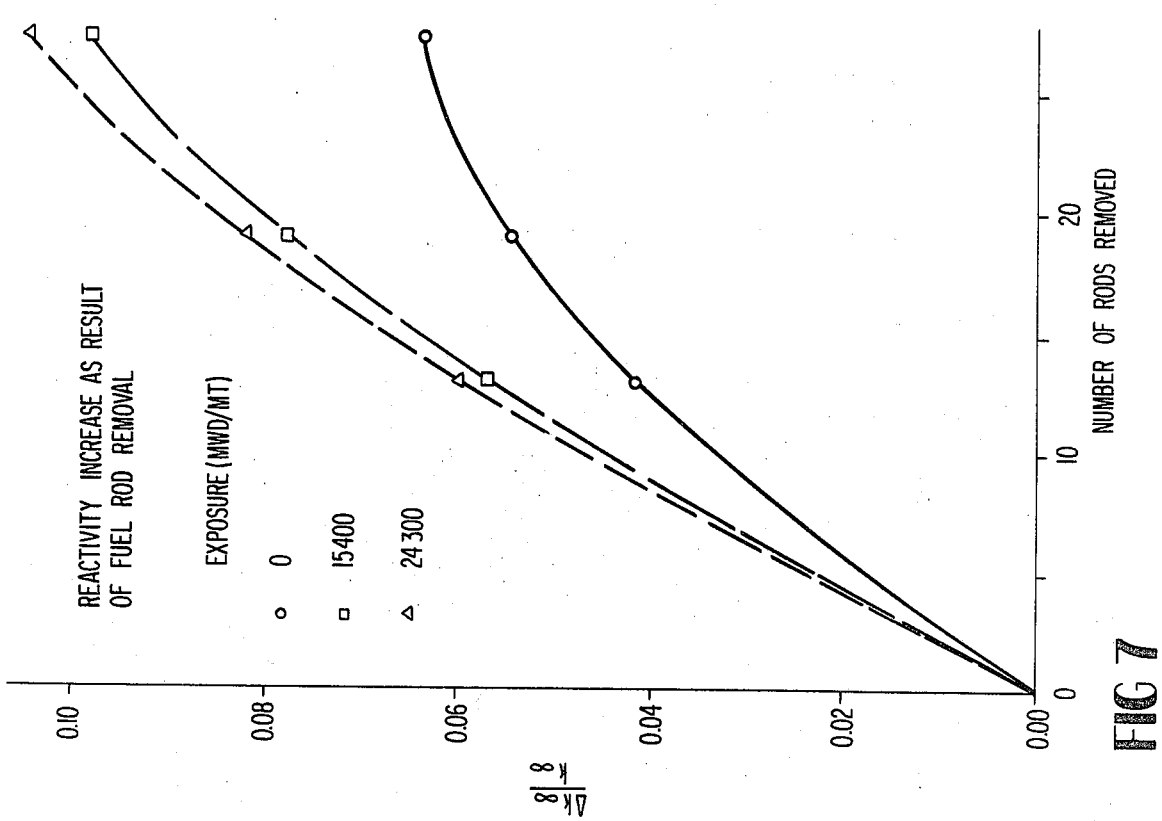
FIG. 7 is a plot of the change in reactivity versus number of fuel rods removed from a bundle at three exposures.
Figure 6:
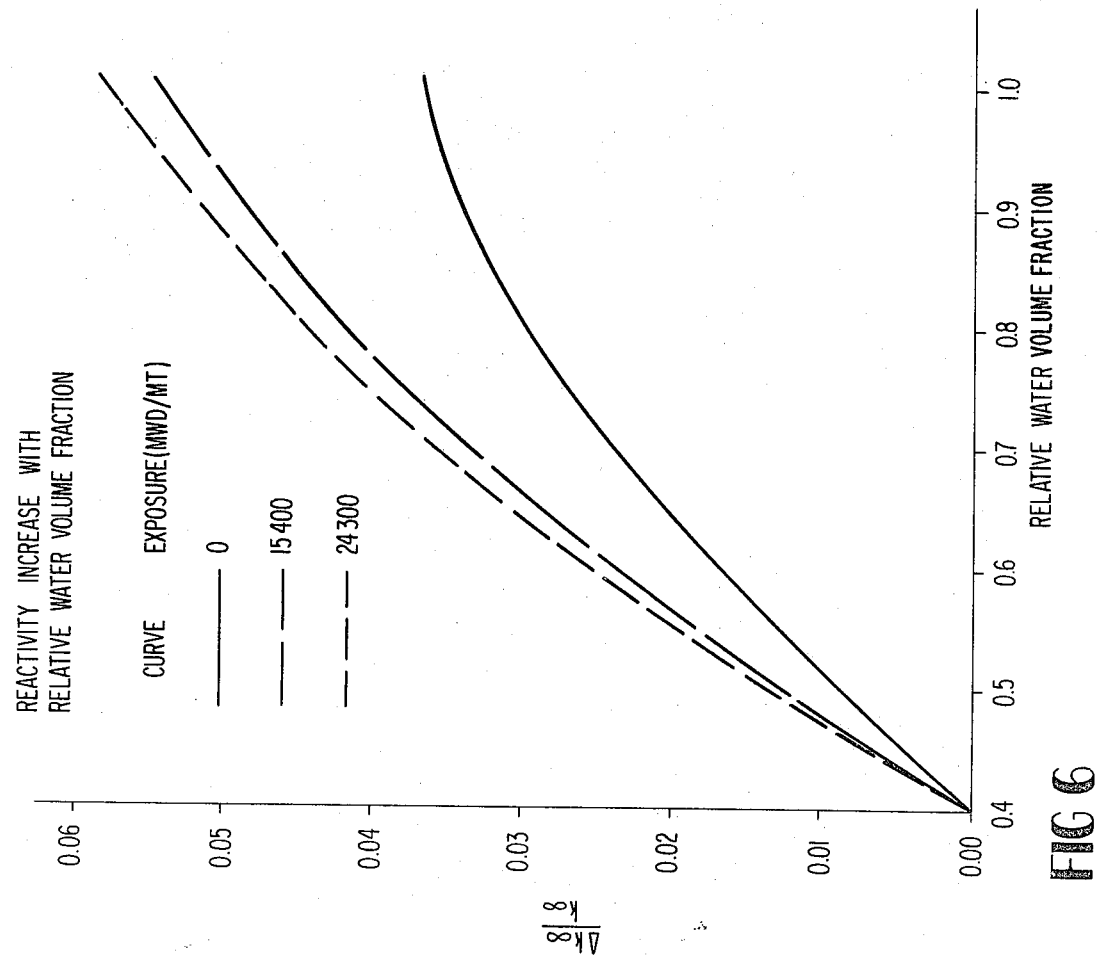
FIG. 6 is a plot of reactivity increase with relative water volume fraction at three exposures.

In accordance with the present invention, after one or more fuel cycles, a number or all of the boiling assemblies are converted in non-boiling assemblies to shift the H/fuel ratio upward nearer the optimum moderated condition for the concentrations of fissile and fertile materials at the time of the conversion. This shift is due to an increase in moderator density within the fuel assembly. The shift may be augmented by removing fuel rods from the assembly. The optimum H/fuel ratio is larger at this time than the optimum value before irradiation begins, and the present invention takes advantage of this shift in optimum H/fuel ratio; whereas the conventional design does not. The shift is shown by the step (dotted line) in the improved design curve in FIG. 1. The shift is accompanied by increased reactivity such that the excess reactivity level for the improved design is significantly higher than for the conventional design after an equivalent period of irradiation. This is shown in the figure by the higher reactivity level for the improved design than for the conventional design after an equal amount of burn-up. This means that the improved design can operate to a higher burn-up than the conventional design, and thereby achieve better fuel utilization. This is because improved conversion of fertile material is achieved, and a near optimum moderated condition is achieved after substantial conversion of fertile material. Therefore, the reactivity of the bred fissile material can support additional assembly operation. FIG. 6 illustrates the increase in excess reactivity ($\Delta K_\infty / K_\infty$) that can be achieved by converting boiling assemblies to non-boiling assemblies after the buildup of significant quantities of fissile Pu. FIG. 7 relates to the augmented design and illustrates the increase in excess reactivity that can be achieved by removing fuel rods after the build-up of significant quantities of fissile Pu.

Summarizing FIG. 1, compared to a fuel assembly irradiation in the conventional manner, the ability to change the neutron spectrum part way through the irradiation allows the production of larger quantities of fissile material through captures in fertile material while the lattice is substantially undermoderated and then allows the fissioning of larger quantities of bred fissle materials in a lattice that is near the optimum moderating ratio for the material content of the irradiated fuel. This results in improved fuel utilization compared to that which can be obtained by irradiation of a conventional fuel assembly in the conventional manner. The new reactor and fuel assembly also reduces the total excess reactivity which must be controlled in the unirradiated fuel assembly by virtue of the large reactivity increase obtained part way through the cycle. In addition to allowing for larger fuel burn-ups in a given reactor system, this reduced control requirement may be used to increase fuel cycle flexibility by allowing the reactor to run longer between successive refuelings. In the conventional fuel assemblies, all the excess reactivity required for the total irradiation must be built in at the start and then controlled by parasitic neutron absorbers. This invention reduces parasitic absorption, which improves neutron economy and thus further contributes to improved fuel utilization by absorbing part of these excess neutrons in fertile fuel material.

Figure 2:
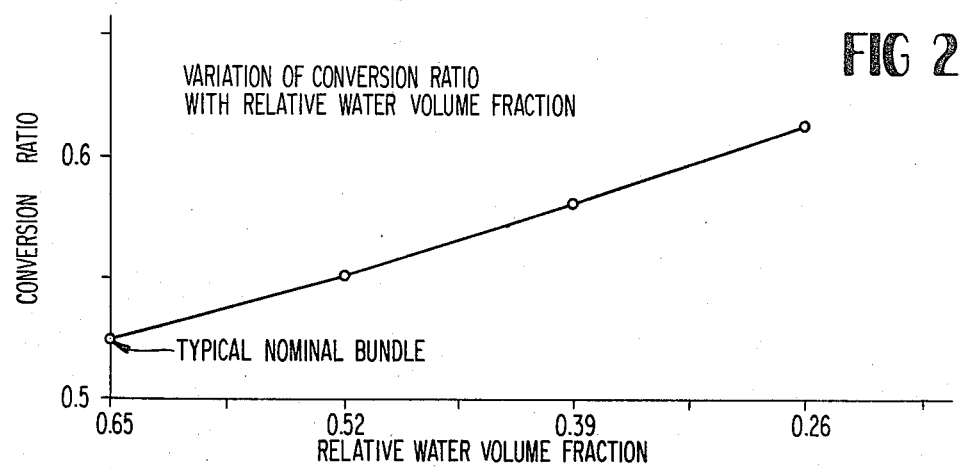
FIG. 2 is a plot of conversion ratio versus relative water volume fraction in a BWR fuel bundle.

FIG. 2 shows the variation of initial conversion ratio as a function of relative moderator density. In FIG. 2, conversion ratio is plotted against the relative water volume fraction in the bundle. As indicated above, a boiling assembly or bundle is moderated by a two-phase mixture—in this case, water and stream. The relative water volume fraction indicates the relative amount of water making up the moderator in the assembly. The balance is steam. As the relative amount of water in the moderator increases, the assembly operates in a near optimum moderated condition and the conversion ratio decreases. Accordingly, FIG. 2 shows that by initially operating in an undermoderated condition, with lower amounts of water as opposed to steam in the moderator, it is possible to obtain higher conversion ratios.

Figure 3:
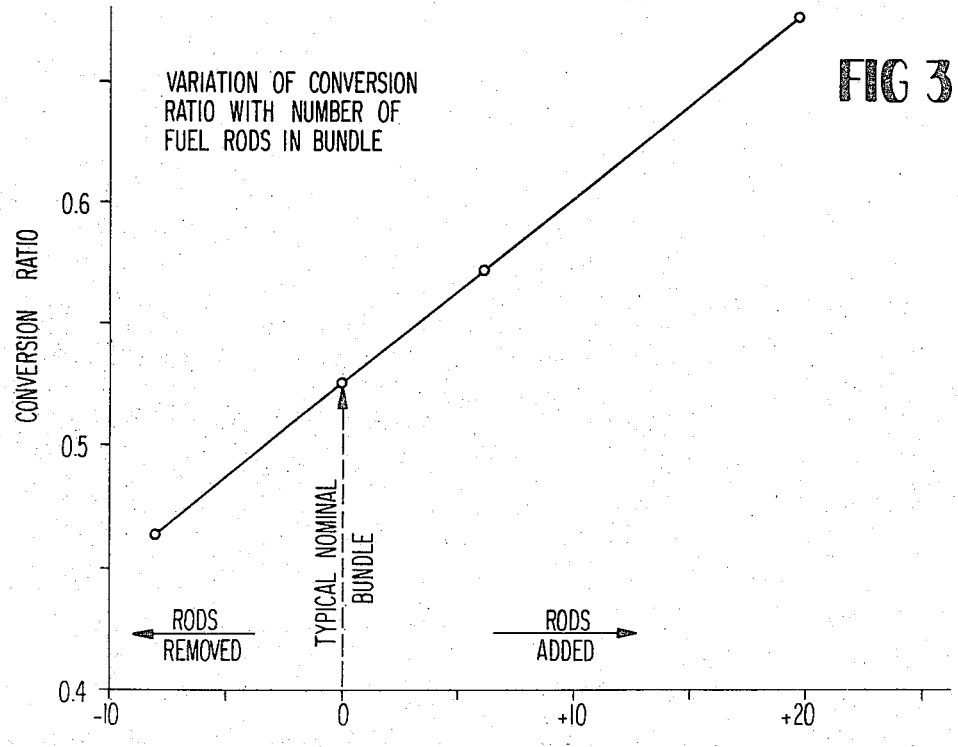
FIG. 3 is a plot of conversion ratio versus number of fuel rods for a BWR reactor.

FIG. 3 relates to the augmented design where fuel rods are also removed part way through the fuel cycle. FIG. 3 shows the variation of initial conversion ratio for a typical boiling water reactor fuel bundle as additional fuel rods are added or some fuel rods are removed. In both FIGS. 2 and 3, the nominal bundle indicated is representative of current designs, and is, therefore, near an optimum H/fuel ratio for a fixed lattice geometry. Nominal fuel bundle data is set forth in the table below.

| Nominal Fuel Bundle Data | |
| --- | --- |
| Fuel Rod Array | 7 × 7 |
| Fuel Rod Pitch, in. | .738 |
| Space Between Fuel Rods, in. | .175 |
| Fuel Rod Outside Diameter, in. | .563 |
| Cladding Inside Diameter, in. | .499 |
| Pellet Outside Diameter, in. | .488 |
| Fuel Channel Wall Thickness, in. | .080 |
| RELATIVE LATTICE WATER VOLUME FRACTION | 0.65 |

In the invention described, the relative moderator density may be reduced and fuel rods may be added or the fuel rod diameter increased to increase the conversion ratio and thereby increase fissile Pu production. Although the bundle excess reactivity is also reduced as the moderator density decreases and fuel rods are added or the fuel rod diameter is increased, this apparent reactivity loss is regained when the assembly is converted from boiling to non-boiling operation and even more so when the fuel rods are removed after one or more cycles of bundle irradiation, as demonstrated in FIG. 1. In fact, more excess reactivity is gained by converting from boiling to non-boiling operation and removing fuel rods after irradiation than could be gained initially by removing rods and operating in a non-boiling mode because of the increased fissile Pu production and the reduced U-235 consumption which resulted from the improved conversion ratio, as will be shown below. If a corresponding reduction in H/fuel ratio were initially made in the conventional design, the reactivity loss accompanying the improved conversion ratio cannot be completely recovered, and, therefore, it is not possible to take advantage of the higher conversion ratios in the conventional design. The reactivity would quickly diminish to low levels at which additional reactor operation would not be supported. For example, in FIG. 1 the first portion of the curve for the improved design of the present invention reaches the reactivity level at which operation in the conventional design is stopped at a much earlier point in time (i.e., after much less fuel burn-up). Consequently, in conventional designs currently employed in light water reactors, a compromise must be made between the desire to achieve a high conversion ratio and the need to achieve sufficient excess reactivity to allow operation of the reactor for reasonable periods of time between refuelings and to achieve economical total fuel irradiation times. This invention eliminates the need for such a compromise and thereby allows improved fuel utilization.

Figure 4:
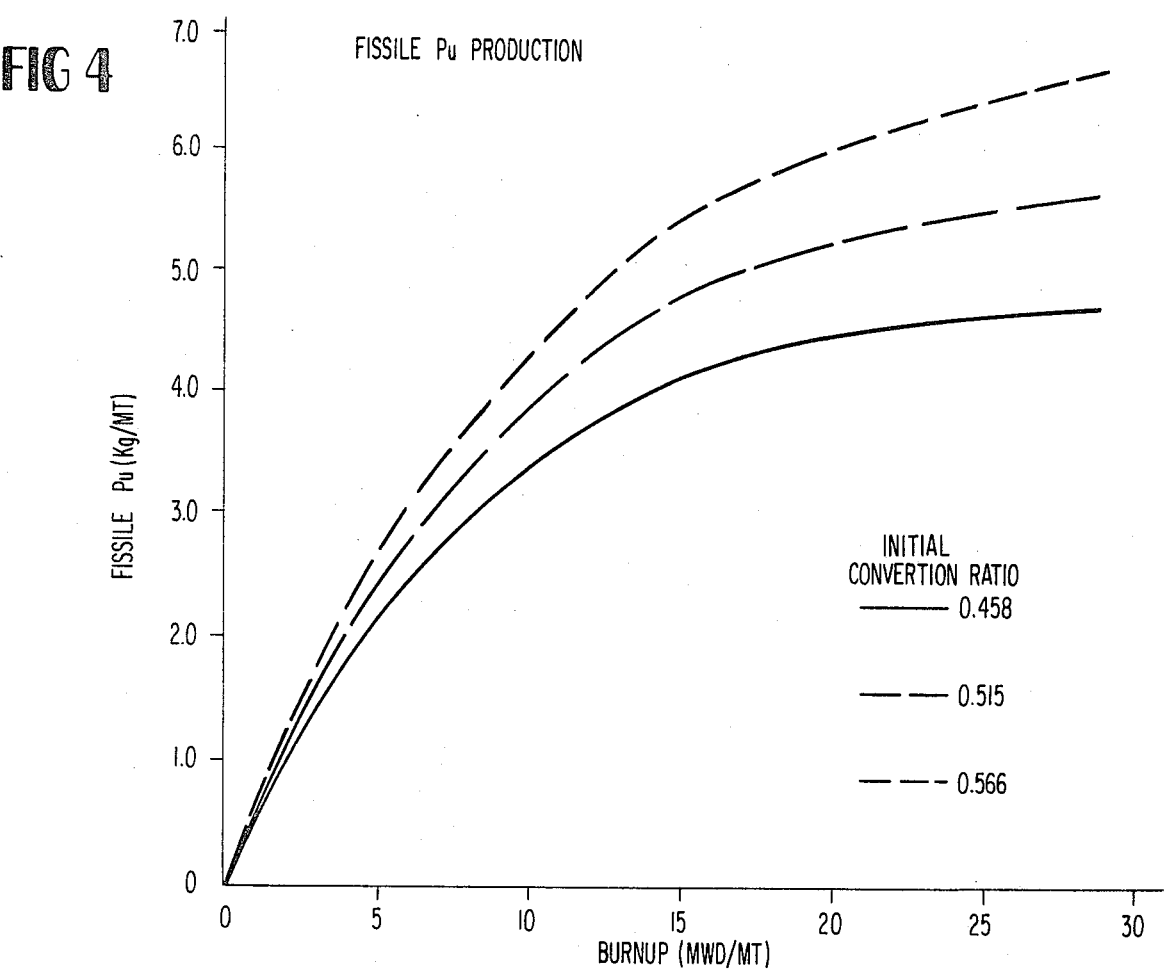
FIG. 4 is a plot of plutonium production versus burn-up at three different conversion ratios.
Figure 5:
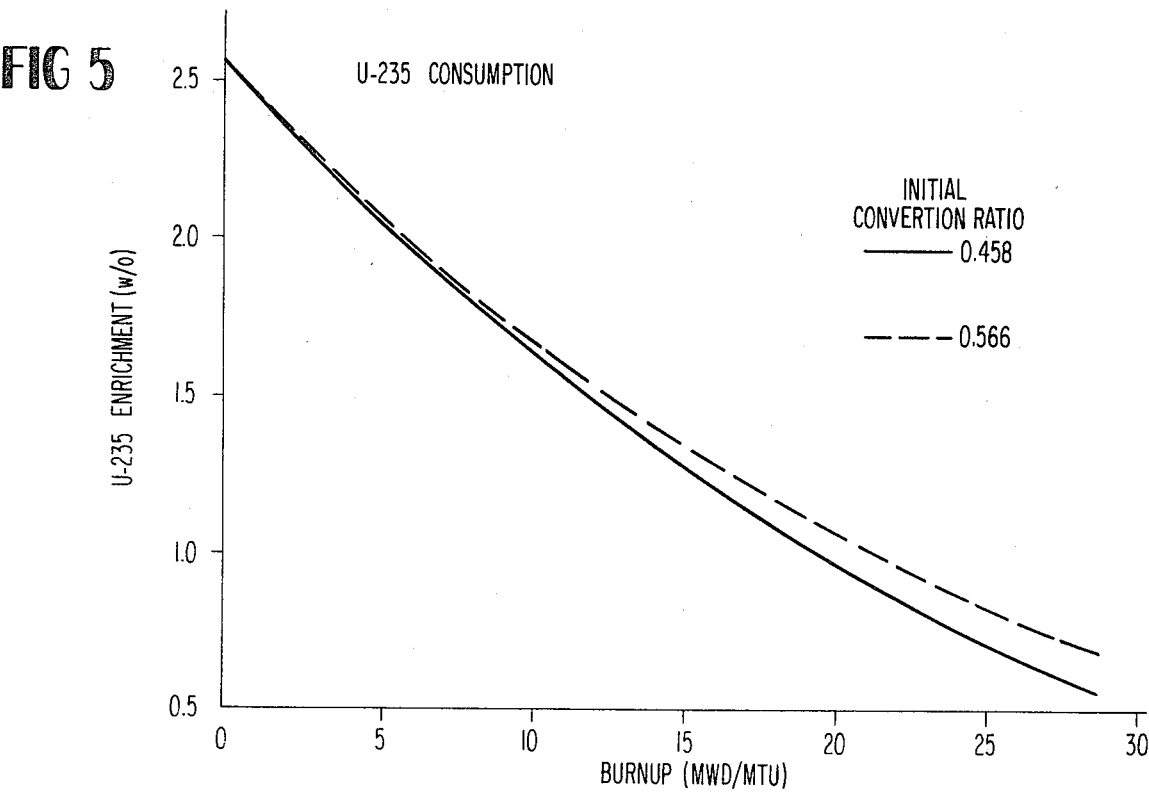
FIG. 5 is a plot of U-235 consumption versus burn-up for two different conversion ratios.

FIG. 4 is an example of the increased fissile Pu production which can be achieved by an increase in conversion ratio. FIG. 5 shows that at these increased conversion ratios, U-235 burn-up is also reduced, and confirms the slower rate of reactivity decline observed in FIG. 1. FIGS. 4 and 5 together show that the period of irradiation spent breeding fissile material is not completely offset by U-235 burn-up. On the contrary, during fissile material production, U-235 is not used up at the same rate as in conventional operation, and consequently, by shifting the neutron energy spectrum, the loss of U-235 can be more than recovered in the gain in bred fissile material.

The point in time at which boiling assemblies are converted to non-boiling assemblies is a matter for optimization of which one of ordinary skill in the art is clearly capable without undue experimentation. Generally, a suitable period of operation will be anywhere from $\frac{1}{4}$ to $\frac{3}{4}$ the normal operating lifetime of the fuel, depending on the reactor and assembly design. The optimum point in time for the conversion and/or removal will be a balance between increased conversion on the one hand and the reactivity level on the other. Clearly, when the concentrations of bred fissile materials approach equilibrium, there is no reason to continue operation in the undermoderated condition since the maximum amount of bred fissile material one can expect to obtain has been achieved. On the other hand, if the reactivity begins to approach a level at which the fuel assembly no longer supports additional operation, the assemblies will then be converted to obtain the accompanying step-up in reactivity.

In accordance with this invention, the reactor may be initially operated with all its fuel assemblies operating in the boiling mode or with a portion operating in the boiling water mode and the remainder operating in the non-boiling mode. This too is a matter of optimization which will depend on the initial operating characteristics of the reactor. If the reactivity level in the reactor is high enough to support operation with all assemblies in the boiling mode, use can be made of this reactor design. In this case, the reactor resembles a boiling water reactor with the distinction that the fuel assemblies are operating in an undermoderated condition, for example, at an increased fuel loading density. On the other hand, and more likely this will be the case, if efficient reactor operation dictates that a portion of the assemblies be operated at higher reactivity levels, then the reactor will initially be operated with both types of assemblies, boiling and non-boiling. Again, efficient and economic reactor utilization will primarily govern the number of fuel assemblies which can initially be operated in the boiling mode.

The instant invention also provides for shifting the neutron energy spectrum—i.e., converting boiling assemblies to non-boiling assemblies or converting from boiling to non-boiling and removing fuel rods—more than one time during the lifetime of the fuel in the reactor. This also will be governed by the fuel characteristics of the reactor and the desire to maximize reactor efficiency. For example, the skilled artisan may find it most efficient to operate the reactor with the minimum number of assemblies in the non-boiling water mode necessary to sustain the chain reaction, and during the lifetime of the fuel periodically convert more boiling assemblies to the non-boiling mode as the reactivity level nears the point at which reactor operation can no longer be sustained. Upon converting the assemblies to the non-boiling mode, the reactivity level within the reactor will increase due to the increased reactivity level in the additional non-boiling assemblies as discussed above.

The teachings of the present invention are also applicable to the blanket regions of a seed-blanket reactor. After breeding fissile material in the blanket regions of the reactor, the neutron spectrum can be shifted for burn-up by converting boiling assemblies to non-boiling assemblies or, in accordance with the augmented design, removing fuel rods from the blanket region. By practicing this operation, it is not necessary to discharge the blanket and reprocess it after what are relatively short periods of irradiation.

It should also be apparent from the above discussion that the teachings of the present invention apply to fertile materials in general, U-238 and Th-232 being those conventionally employed.

There are several methods whereby the fuel assembly operation may be changed from the boiling to the non-boiling mode. One simple and efficient method of accomplishing this change is by changing the fuel assembly pressure drop, and thus the resultant coolant flow through the fuel assembly. The pressure drop may be controlled by either fixed or variable orifices located at the fuel assembly inlet or outlet. In one method, the orifices can remain in a fixed core location, and the fuel assembly flow would be controlled by changing its location in the core from a position with a tight orifice to a position with a loose orifice or no orifice. Alternatively, the orifices can be an integral part of the fuel assembly, and would be changed by removing the fuel assembly or orifice from the core or by adjusting a mechanical device which is an integral part of the fuel assembly, while it remains in position within the core. U.S. Pat. Nos. 3,158,543; 3,161,571; 3,235,463; and 3,879,259 disclose orificing mechanisms by which the coolant flow through the fuel assemblies might be controlled to perform the conversion taught in the instant invention. Flow separation between boiling and non-boiling fuel assemblies can be maintained by fuel assembly channels which enclose the boiling and/or non-boiling fuel assemblies. Alternatively, permanently installed partitions within the core could be used to maintain the desired flow separation between boiling and non-boiling fuel assemblies.

It should be apparent from the foregoing that numerous operations and constructions are possible for performing the conversion from boiling to non-boiling mode taught by this disclosure, and, regardless of the means, such conversion would fall within the present invention.

It has been pointed out above that the change in H/fuel ratio produced by the change from boiling to non-boiling assemblies may be augmented by a change in the fuel loading density. A process wherein fuel rods are removed from the fuel assembly part way through the fuel cycle is disclosed in the incorporated copending application. In this alternative, a tighter lattice spacing would be used for initial fuel assembly operation in the boiling mode, and when the envelope dimensions for the boiling and non-boiling assemblies are the same size, the change in fuel loading density would be accomplished by removing a number of rods in a regular pattern and the remaining rods would then be used in a looser spacing for operation in the non-boiling mode. The rods removed from the boiling assembly could be used to construct a non-boiling assembly. On the other hand, the removed rods might be withdrawn from the reactor and subsequently used in a different reactor.

As a further alternative, the change in fuel loading density could be accomplished without removal of any fuel rods. In this case, the envelope dimensions of the boiling assemblies would be smaller than the non-boiling assemblies and the change in fuel loading density would be accomplished by an increase in the pitch or lattice spacing. The foregoing discussion assumes that the fuel loading density is changed at the same time the boiling assemblies are converted to non-boiling assemblies; however, as pointed out earlier, the two need not occur at the same time, and the foregoing discussion is equally applicable to the case where the two operations are performed after different periods of irradiation.

Figure 8:
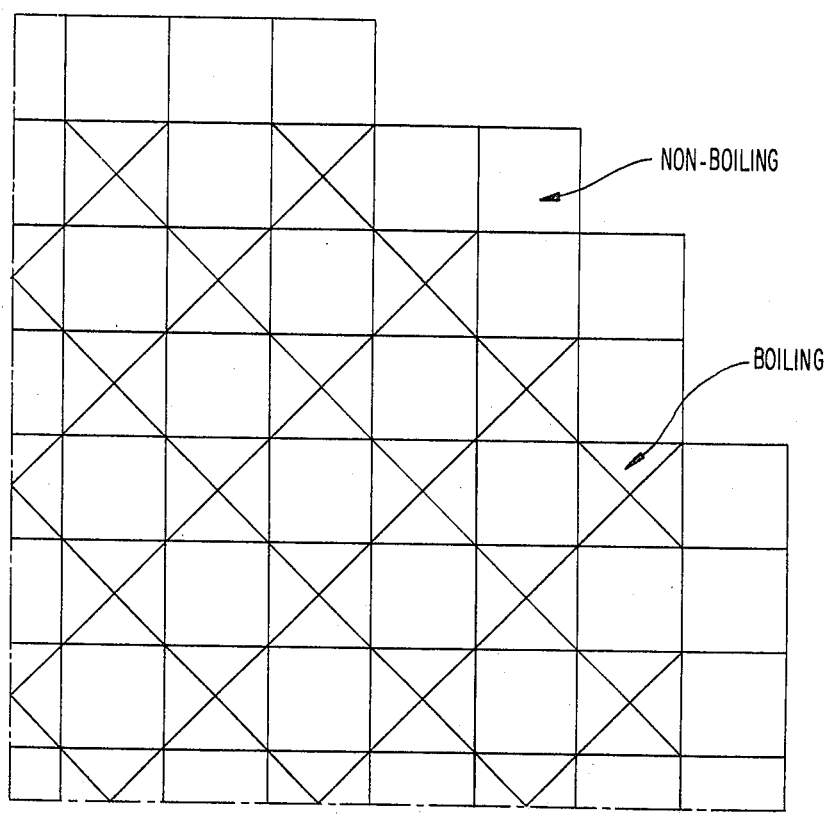
FIGS. 8-11 are schematic cross-sections through the reactor core mid-plane which show various core arrangements in accordance with the invention.
Figure 9:
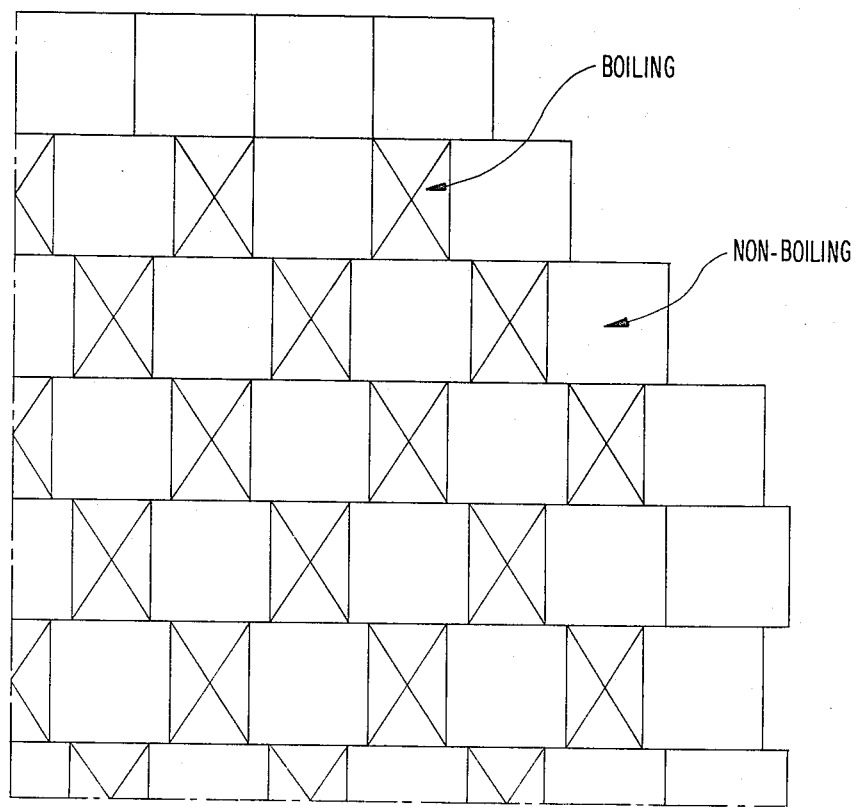

In the preferred embodiment, the boiling and non-boiling fuel assemblies are rather uniformly distributed over most of the interior core area to maintain a flat global radial power distribution. Preferably, non-boiling fuel assemblies are located in all positions on the core periphery to reduce the total neutron leakage from the core (and thereby improve the core conversion ratio), and such an arrangement could also be used to further flatten the global radial power distribution by locating the higher excess reactivity non-boiling fuel assemblies in peripheral core locations. This type of arrangement is shown in FIGS. 8 and 9. Alternatively, a core arrangement which tends to group the two types of assemblies in annular rings may be used with some of the non-boiling assemblies again located on the core periphery. This is shown in FIGS. 10 and 11.

As pointed out above, the ratio of total boiling to non-boiling fuel assembly volume is a design parameter which is subject to optimization. Suitable regular core geometries may be constructed using various arrangements of square and/or rectangular fuel assemblies of equal or unequal volumes (note FIG. 9). Such arrangements provide sufficient flexibility to allow large variations in the ratio of total boiling to non-boiling core volume.

Referring to FIGS. 8-11 in more detail, FIG. 8 illustrates a typical reactor core arrangement (a horizontal cross-section through the core mid-plane) in accordance with the invention. In this core, the boiling and non-boiling fuel assemblies are of square cross-section and of equal total area. Both types of fuel assemblies consist of arrays of fuel rods as in a conventional light water reactor, but each type of assembly may or may not consist of the same total number of fuel rods. FIG. 9 illustrates another typical core arrangement in accordance with the invention. In this case, the non-boiling fuel assemblies are of square cross-section, and the boiling fuel assemblies are of rectangular cross-section comprising a total area less than a non-boiling fuel assembly. In both figures, the two types of fuel assemblies are distributed rather uniformly across the entire core cross-section, but only non-boiling fuel assemblies are located on the core periphery in accordance with one of the principles of the invention.

Figure 10:
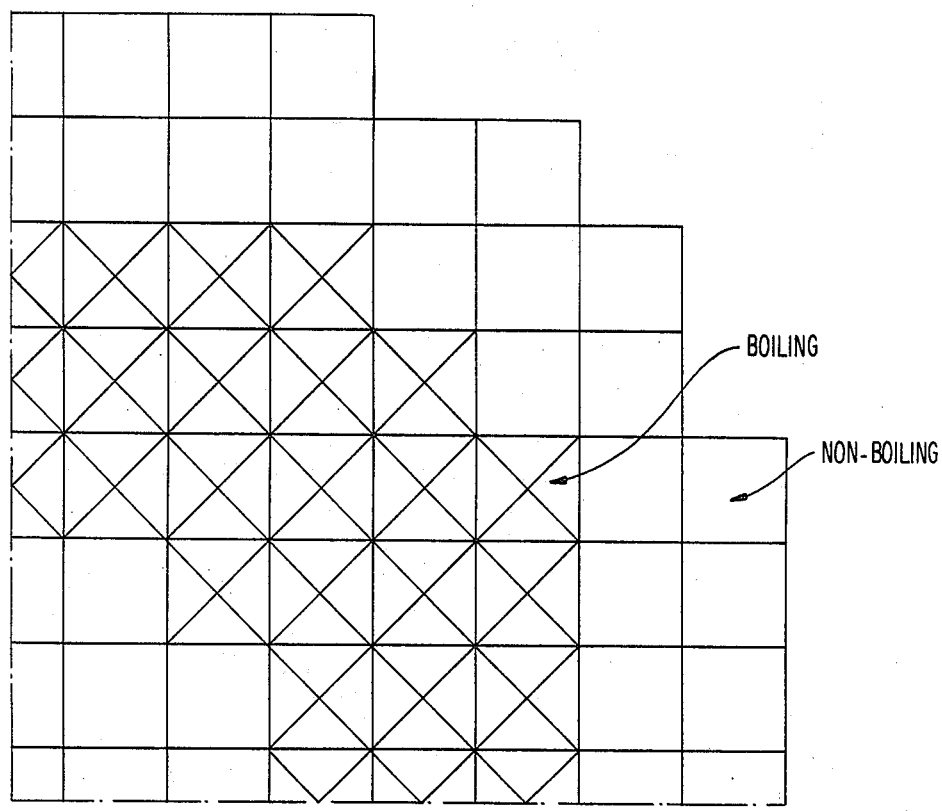
Figure 11:
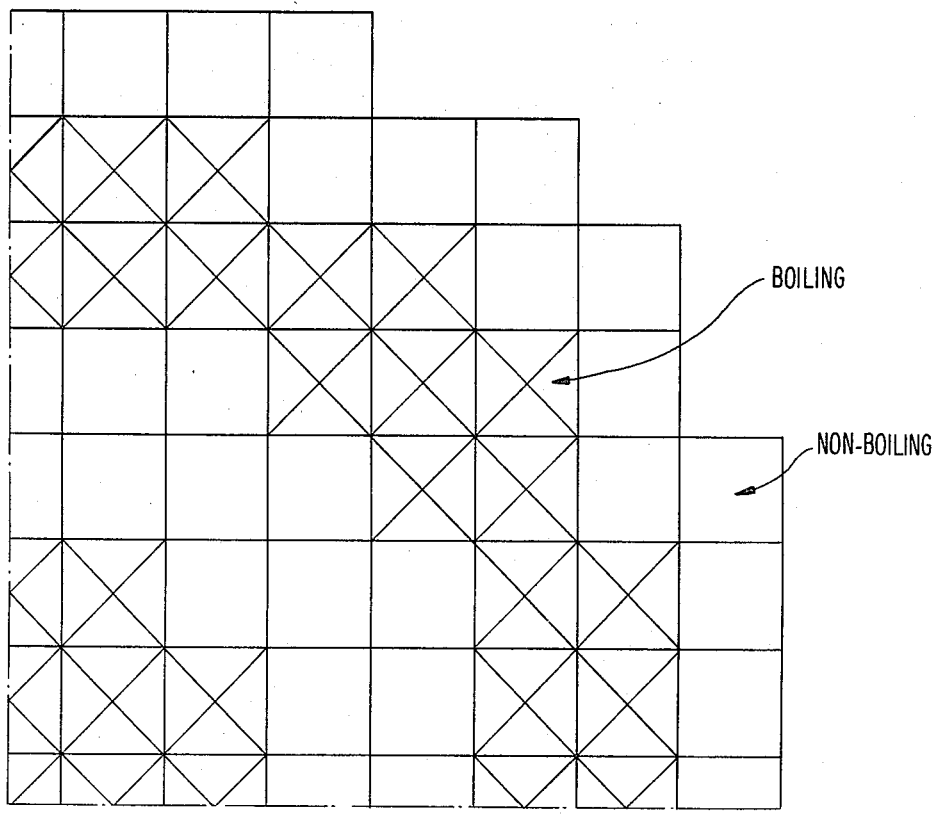

FIGS. 10 and 11 illustrate different core arrangements in which each type of fuel assembly is clustered together in subregions which are generally of cylindrical or annular cross-sectional shapes. Although the two types of fuel assemblies are shown as square cross-sections of equal total area, they may also be of rectangular cross-section and of unequal total areas as illustrated in FIGS. 8 and 9. The arrangements illustrated in FIGS. 10 and 11 are more amenable to the case (described below) where a multi-pass coolant flow pattern is utilized since flow divider design may be simplified with the smaller number of distinct core regions.

Reactor control would be augmented by employment of current conventional light water reactor technology using either pressurized water reactor- and/or boiling water reactor-type control rods. For optimum control of the axial power distribution, control rods would enter from the top in non-boiling fuel assemblies and from the bottom in boiling fuel assemblies. Alternatively, control rods could be used solely in either the boiling or the non-boiling fuel assemblies. If control rods were located solely in the non-boiling fuel assemblies, higher conversion ratios would be achieved in the boiling fuel assemblies, and such a system would yield the best fuel utilization.

The reduced reactor control requirement also makes it possible to eliminate the soluble boron control system which is currently used in pressurized water reactors. If reactor control requirements exceed the capability of the control rod system, conventional burnable poisons located in the fuel assemblies could be used to provide the additional control capability.

The steam cycle utilized for this reactor concept may be characteristic of either a pressurized water reactor (PWR) or a boiling water reactor (BWR). In the case where a PWR steam cycle is chosen, the outlet from both boiling and non-boiling fuel assemblies would be mixed inside the reactor vessel before being routed to the primary side of the steam generators. The operating pressure would be optimized at some intermediate value between the operating pressures characteristic of conventional PWR and BWR designs—between about 1000 and 2200 psig, respectively.

A BWR-type steam cycle may be utilized by employing a multi-pass coolant flow concept. The coolant would first be routed through the non-boiling fuel assemblies (either upward or downward coolant flow) and the rerouted so as to flow upward through the boiling fuel assemblies, where the additional heating results in the desired amount of boiling in these fuel assemblies. The coolant outlet would then pass through steam separators and dryers before being routed to the turbine as in a conventional BWR. As in the PWR case, the operating pressure would again be optimized at a value between those characteristic of conventional PWR's and BWR's. The steam cycle utilized in this reactor concept represents conventional and well-established technology.

While the invention has been described above in detail and with reference to specific embodiments, it will be apparent to one of ordinary skill in the art that numerous changes and variations are possible without departing from the spirit and scope of the invention covered by the following claims.

I claim:

1. A method for operating a liquid moderated thermal reactor which comprises:
   (a) initially irradiating with all or a portion of the fuel assemblies in the core of the reactor operating in an undermoderated boiling mode, said fuel assemblies being uranium fuel assemblies enriched with fissile uranium material, and said undermoderated condition resulting in increased production of fissle plutonium with reduced uranium burn-up which increases the degree of undermoderation during said irradiation, and,
   (b) after one or more fuel cycles, converting all or a portion of said undermoderated boiling fuel assemblies to operation in a near optimum moderated non-boiling mode for the fuel composition at the time of said conversion, the undermoderated boiling mode and the moderated non-boiling mode being practiced on a system which does not rely on $D_2O$ to shift the neutron spectrum but wherein undermoderated operation results from a low H/fuel ratio due to the initial boiling mode of operation and moderated operation results from an increased H/fuel ratio due to the subsequent non-boiling mode of operation.

2. The method of claim 1 wherein said reactor is a light water reactor.

3. The method of claim 2 comprising the additional step of reducing the fuel loading density of said initially boiling undermoderated fuel assemblies after a suitable period of irradiation, which period of operation may be the same as or different than the suitable period of irradiation prior to said boiling to non-boiling conversion.

4. The method of claim 3 wherein said change in fuel loading density is accomplished by withdrawing a portion of the fuel rods from said initially boiling undermoderated fuel assembly.

5. The method of claim 2 wherein said irradiation is initiated with a portion of the fuel assemblies operating in said undermoderated boiling mode.

6. The method of claim 2 wherein said boiling to non-boiling conversion is performed on more than one occasion during the lifetime of the fuel in the fuel assembly.

7. The method of claim 4 wherein said boiling to non-boiling conversion and said fuel rod removed are performed on the same occasion.

8. The method of claim 4 wherein said boiling to non-boiling conversion and said fuel rod removed are performed on different occasions.

9. The method of claim 4 wherein said boiling to non-boiling conversion and/or said fuel rod removal are performed on more than one occasion during the lifetime of the fuel in the fuel assembly.

10. The method of claim 3 wherein said change in fuel loading density is accomplished by increasing the lattice spacing of the fuel rods making up said initially boiling undermoderated assembly.

11. The method of claim 4 wherein the fuel rods removed from said initially boiling undermoderated assemblies are used to construct additional non-boiling near optimum moderated assemblies.

12. The method of claim 2 wherein said undermoderated boiling assembly is characterized by a fuel loading density higher than that of a conventional BWR assembly.

13. The method of claim 1, wherein during the initial irradiating the low hydrogen-to-fuel ratio in said reactor in the boiling mode is maintained until the concentration of bred fissile plutonium approaches equilibrium, whereafter an increased hydrogen-to-fuel ratio is maintained during the non-boiling mode.

14. The method of claim 1, wherein the degree of undermoderation in step (a) is such that generated neutrons are not slowed to the point to maximize fission whereby excess neutrons which are generated are absorbed by fuel present to generate the fissile plutonium and/or fissile uranium and wherein when said moderated condition of step (b) is reached the neutron energy spectrum is shifted to a lower level to maximize the probability of fission.

15. The method of claim 13, wherein the change from the low hydrogen-to-fuel ratio to the increased hydrogen-to-fuel ratio in the boiling mode and the non-boiling mode, respectively, results in a change in the average water density in the fuel assemblies in the reactor, said change in the average water density being due to the physical phenomenon of operation in the boiling mode as opposed to operation in the non-boiling mode.

* * * * *